United States Patent
Kilduff et al.

(10) Patent No.: US 10,006,708 B2
(45) Date of Patent: Jun. 26, 2018

(54) PIVOTALLY-LEVERAGED MANUAL CENTRIFUGAL DRIVE

(71) Applicant: Dalla Piazza & Co., Schneisingen (CH)

(72) Inventors: Edward H. Kilduff, New York, NY (US); Chi Ming Tse, Kwai Chung (HK); Gareth Brown, Brooklyn, NY (US); Chi Fai Cheung, Kwai Chung (HK)

(73) Assignee: Enrico Dalla Piazza, Nürensdorf (CH)

(*) Notice: Subject to any disclaimer, the term of this patent is extended or adjusted under 35 U.S.C. 154(b) by 1168 days.

(21) Appl. No.: 13/648,520

(22) Filed: Oct. 10, 2012

(65) Prior Publication Data

US 2013/0036621 A1    Feb. 14, 2013

Related U.S. Application Data

(63) Continuation of application No. 12/069,374, filed on Feb. 7, 2008.

(60) Provisional application No. 60/900,367, filed on Feb. 7, 2007.

(51) Int. Cl.
  *A47J 43/24*    (2006.01)
  *F26B 11/02*    (2006.01)

(52) U.S. Cl.
  CPC .............. *F26B 11/02* (2013.01); *A47J 43/24* (2013.01); *Y10T 74/18088* (2015.01); *Y10T 74/18128* (2015.01)

(58) Field of Classification Search
  USPC .............. 99/495, 509–511; 241/169.1, 101.2
  See application file for complete search history.

(56) References Cited

U.S. PATENT DOCUMENTS

| | | | |
|---|---|---|---|
| 178,078 A * | 5/1876 | Plyer | 99/460 |
| 507,903 A | 10/1893 | Hancock | |
| 1,194,318 A | 8/1916 | Power | |
| 1,511,287 A | 10/1924 | Lindley | |
| 1,619,550 A | 3/1927 | Thebaud et al. | |
| 2,246,054 A | 6/1941 | Marty | |
| 2,347,383 A | 4/1944 | Wiegratz | |

(Continued)

FOREIGN PATENT DOCUMENTS

| | | |
|---|---|---|
| CH | 351731 | 3/1961 |
| CH | 353509 | 5/1961 |

(Continued)

*Primary Examiner* — Anne M Antonucci
*Assistant Examiner* — Renee LaRose
(74) *Attorney, Agent, or Firm* — Law Office of Thomas J. Brindisi

(57) ABSTRACT

A pivotally-leveraged manual centrifugal drive according to a preferred embodiment of the invention for use with a bowl and a basket formed to nest within the bowl, comprising: a) a housing formed to mate with the bowl; b) a rotation wheel rotatably connected to the housing, formed to mate with the basket, and having a plane of rotation; c) a handle pivotally attached to the housing and oriented to move in a plane that is substantially perpendicular to the plane of rotation of the rotation wheel; and d) gears connecting the handle to the rotation wheel. Also disclosed are an automatic clutch that engages the rotation wheel only when the handle is moved in one direction, and a braking mechanism that includes a disk having a diameter substantially smaller than the rotation wheel.

13 Claims, 8 Drawing Sheets

(56) References Cited

U.S. PATENT DOCUMENTS

| | | |
|---|---|---|
| 2,407,819 A | 9/1946 | Dolan, 2nd |
| 2,507,681 A * | 5/1950 | Sage ............................... 74/157 |
| 2,544,367 A * | 3/1951 | Tholl ............................ 210/366 |
| 2,592,481 A | 4/1952 | Spencer et al. |
| 2,796,987 A | 6/1957 | Meyer |
| D183,384 S | 8/1958 | de Mille |
| 3,123,114 A | 3/1964 | Andrews et al. |
| 3,139,917 A | 7/1964 | Elmore |
| 3,156,278 A | 11/1964 | Otto |
| 3,461,820 A * | 8/1969 | Falco ............................ 425/357 |
| 3,581,790 A | 6/1971 | del Conte |
| 3,729,096 A | 4/1973 | Fitzner et al. |
| 3,885,321 A * | 5/1975 | Fouineteau ........................ 34/58 |
| 3,933,315 A * | 1/1976 | Popeil ............................ 241/166 |
| 3,990,358 A | 11/1976 | Cade |
| 4,007,751 A | 2/1977 | Commiant |
| 4,101,070 A * | 7/1978 | Hoare et al. ...................... 494/9 |
| 4,101,978 A | 7/1978 | Brackman |
| 4,124,310 A | 11/1978 | Brackman et al. |
| 4,209,916 A * | 7/1980 | Doyel ............................... 34/58 |
| 4,264,215 A | 4/1981 | Nunlist et al. |
| D260,346 S * | 8/1981 | Lebowitz ...................... D7/665 |
| 4,374,574 A * | 2/1983 | David ........................ 241/169.1 |
| 4,386,740 A | 6/1983 | Van Deursen |
| 4,442,764 A | 4/1984 | Bos et al. |
| 4,467,530 A * | 8/1984 | Fesmire et al. .................. 34/313 |
| 4,591,273 A * | 5/1986 | Meyer et al. .................. 366/288 |
| 4,682,740 A | 7/1987 | Conigliaro et al. |
| 4,702,162 A * | 10/1987 | Sontheimer et al. ........... 99/495 |
| 4,768,429 A | 9/1988 | Federighi |
| 4,905,465 A | 3/1990 | Jones et al. |
| 4,947,711 A * | 8/1990 | Giebeler ........................ 81/3.37 |
| 4,967,970 A * | 11/1990 | Michel ........................... 241/169 |
| D315,657 S | 3/1991 | Ruttimann |
| 5,064,535 A * | 11/1991 | Hsu ............................. 210/380.1 |
| 5,082,190 A * | 1/1992 | Chen ............................ 241/169.1 |
| 5,088,652 A * | 2/1992 | Chen ............................ 241/169.1 |
| 5,148,995 A * | 9/1992 | Hurst ............................... 241/30 |
| 5,245,726 A | 9/1993 | Rote et al. |
| 5,307,738 A | 5/1994 | Amstad |
| 5,360,170 A | 11/1994 | Cartellone |
| 5,397,100 A * | 3/1995 | Miller ............................ 251/188 |
| 5,401,159 A | 3/1995 | Hsu |
| 5,435,237 A | 7/1995 | Huang |
| 5,490,453 A * | 2/1996 | Mackay ............................ 99/495 |
| 5,562,025 A | 10/1996 | Bull et al. |
| 5,562,256 A | 10/1996 | Wolman et al. |
| 5,617,783 A | 4/1997 | Beeler |
| 5,683,055 A * | 11/1997 | Dufour .......................... 242/394 |
| 5,735,193 A * | 4/1998 | Chang ............................. 99/494 |
| 5,778,769 A * | 7/1998 | Dodson ............................ 99/536 |
| 5,782,416 A | 7/1998 | Nejatbina |
| D396,992 S | 8/1998 | Lallemand |
| 5,823,672 A | 10/1998 | Barker |
| 5,839,826 A | 11/1998 | Eubanks |
| 5,842,651 A | 12/1998 | Smothers |
| 5,865,109 A * | 2/1999 | Bull ................................ 99/495 |
| 5,904,090 A | 5/1999 | Lillelund et al. |
| D411,720 S * | 6/1999 | Lillelund et al. .............. D7/665 |
| 5,920,997 A * | 7/1999 | Girtman ........................ 33/414 |
| 5,934,160 A * | 8/1999 | Gibson ......................... 81/3.37 |
| 5,950,529 A * | 9/1999 | Molloy ............................ 99/633 |
| 5,960,709 A | 10/1999 | Yip |
| 5,992,309 A * | 11/1999 | Mulhauser et al. ............ 99/495 |
| 5,996,483 A | 12/1999 | Yip |
| 6,000,650 A * | 12/1999 | Penaranda et al. ......... 241/282.1 |
| 6,018,883 A * | 2/2000 | Mulhauser ........................ 34/58 |
| 6,035,771 A * | 3/2000 | Conran et al. ................. 99/510 |
| 6,101,727 A * | 8/2000 | Chong ............................ 30/418 |
| 6,110,140 A * | 8/2000 | Silver ............................. 604/74 |
| D434,597 S | 12/2000 | Yip |
| 6,231,909 B1 * | 5/2001 | Levinson ....................... 426/433 |
| 6,260,479 B1 * | 7/2001 | Friedrich et al. ................ 99/468 |
| 6,298,775 B1 * | 10/2001 | Chen ............................... 99/422 |
| 6,357,322 B1 * | 3/2002 | Dolan et al. ................... 81/3.37 |
| D462,881 S * | 9/2002 | Mulhauser et al. ........... D7/665 |
| 6,473,988 B1 * | 11/2002 | Mulhauser et al. ............ 34/58 |
| 6,508,425 B2 * | 1/2003 | Wu ............................. 241/169.1 |
| 6,510,785 B1 * | 1/2003 | Margolin ...................... 99/495 |
| 6,533,199 B2 * | 3/2003 | Wu ............................. 241/169.1 |
| 6,616,076 B2 * | 9/2003 | Wong ............................ 241/168 |
| 6,622,618 B1 * | 9/2003 | Glucksman et al. ........... 99/495 |
| 6,877,684 B2 | 4/2005 | Wu |
| 6,895,679 B2 * | 5/2005 | Dekort ............................ 33/414 |
| 6,899,021 B2 | 5/2005 | Riede |
| 7,111,546 B2 * | 9/2006 | Siegel et al. ................... 99/495 |
| 7,681,495 B2 | 3/2010 | Wan et al. |
| 2001/0035101 A1 * | 11/2001 | Ancona et al. ................. 99/495 |
| 2002/0145064 A1 * | 10/2002 | Wu ............................. 241/169.1 |
| 2002/0153440 A1 * | 10/2002 | Holcomb et al. .......... 241/169.1 |
| 2003/0041747 A1 * | 3/2003 | Lane ............................... 99/495 |
| 2003/0070566 A1 * | 4/2003 | Areh et al. ..................... 99/495 |
| 2003/0075057 A1 * | 4/2003 | Saunders et al. ............... 99/495 |
| 2003/0221325 A1 * | 12/2003 | Dekort ............................ 33/414 |
| 2004/0069881 A1 * | 4/2004 | Arduini ...................... 241/169.1 |
| 2004/0103552 A1 * | 6/2004 | Rhon ............................... 34/58 |
| 2004/0159727 A1 * | 8/2004 | Mueller ...................... 241/169.1 |
| 2005/0011373 A1 * | 1/2005 | Areh et al. ..................... 99/495 |
| 2005/0061898 A1 * | 3/2005 | Whitmer ..................... 241/169.1 |
| 2005/0132590 A1 * | 6/2005 | Scillia et al. ................... 33/414 |
| 2005/0133644 A1 * | 6/2005 | Wu ................................ 241/169 |
| 2005/0157588 A1 * | 7/2005 | Jonsson ........................ 366/139 |
| 2005/0160921 A1 * | 7/2005 | Ono ................................ 99/511 |
| 2005/0204935 A1 * | 9/2005 | Siegel ............................ 99/495 |
| 2005/0235446 A1 * | 10/2005 | Eggers ....................... 15/220.1 |
| 2006/0037485 A1 * | 2/2006 | Ho ................................. 99/495 |
| 2006/0048653 A1 * | 3/2006 | Norrvik .......................... 99/623 |
| 2006/0112787 A1 * | 6/2006 | Cheung ........................ 81/3.37 |
| 2006/0117965 A1 * | 6/2006 | Parsons et al. ................. 99/495 |
| 2006/0123998 A1 * | 6/2006 | Castellani ...................... 99/495 |
| 2006/0144257 A1 * | 7/2006 | Cheng et al. ................... 99/511 |
| 2006/0169152 A1 * | 8/2006 | Lin et al. ........................ 99/495 |
| 2006/0169810 A1 * | 8/2006 | Holcomb et al. .......... 241/169.1 |
| 2006/0207441 A1 * | 9/2006 | Mulhauser et al. ............ 99/495 |
| 2007/0079669 A1 * | 4/2007 | Wrobel et al. ................ 81/3.33 |
| 2007/0089570 A1 * | 4/2007 | Vitrac et al. ................... 81/3.37 |
| 2007/0101870 A1 * | 5/2007 | Liu et al. ........................ 99/495 |
| 2009/0090254 A1 | 4/2009 | Herren |

FOREIGN PATENT DOCUMENTS

| | | | |
|---|---|---|---|
| EP | 0176450 A1 | 4/1986 | |
| EP | 1400196 A2 | 3/2004 | |
| FR | 743906 | 4/1933 | |
| FR | 1012262 | 7/1952 | |
| FR | 1259498 | 3/1961 | |
| FR | 2642294 A1 | 8/1990 | |
| FR | 2713069 | 6/1995 | |
| GB | 405485 | 2/1934 | |
| GB | 2355946 A | 5/2001 | |
| GB | 2399566 A * | 9/2004 | ............ B67B 7/04 |
| JP | 57-26670 | 6/1982 | |
| JP | 62100989 | 5/1987 | |
| JP | 02-046276 | 2/1990 | |
| JP | 3022041 | 12/1995 | |
| JP | 10-174647 | 6/1998 | |
| WO | 02/085168 A1 | 10/2002 | |
| WO | 2004073474 A1 | 9/2004 | |
| WO | 2005115209 A1 | 12/2005 | |
| WO | 2007128154 A1 | 11/2007 | |
| WO | 2007128155 A1 | 11/2007 | |
| WO | WO 2008080132 A2 * | 7/2008 | ............ A47J 43/24 |

* cited by examiner

PIVOTALLY-LEVERAGED MANUAL CENTRIFUGAL DRIVE

RELATED APPLICATION

This application is a continuation of co-pending application Ser. No. 12/069,374 filed Feb. 7, 2008 and claims the benefit of U.S. provisional patent application Ser. No. 60/900,367 filed Feb. 7, 2007 and entitled "Manually-Driven Centrifugal Drying Device."

FIELD OF THE INVENTION

The present invention relates to devices used to spin items centrifugally, and more particularly, to a pivotally-leveraged manual centrifugal drive such as for use in drying items such as leafy vegetables and other food items.

BACKGROUND OF THE INVENTION

U.S. Pat. No. 5,865,109 to Bull and U.S. Pat. No. 5,904,090 to Lillelund et al. disclose manually-driven centrifugal drying devices that are hand-cranked by a handle that is integrated with the lid assembly and oriented for a direction of movement in a plane parallel with the lid assembly. U.S. Pat. No. 6,018,883 to Mulhauser discloses a manually-driven centrifugal drying device with a handle that is oriented for movement perpendicular to the lid assembly, but the mechanism does not provide leverage to attain rapid movement of the spinner. U.S. Patent Application Publication No. 2006/0144257 to Cheng et al. discloses a manually-driven centrifugal drying device with a pull-cord drive that generates leverage but is oriented for movement not perpendicular to the lid assembly.

SUMMARY OF THE INVENTION

A pivotally-leveraged manual centrifugal drive according to a preferred embodiment of the invention for use with a bowl and a basket formed to nest within the bowl comprises: a) a housing formed to mate with the bowl; b) a rotation wheel rotatably connected to the housing, formed to mate with the basket, and having a plane of rotation; c) a handle pivotally attached to the housing and oriented to move in a plane that is substantially perpendicular to the plane of rotation of the rotation wheel; and d) gears connecting the handle to the rotation wheel. The device may also include an automatic clutch that engages the rotation wheel only when the handle is moved in one direction. A further optional feature is a mechanism for decelerating the rotation wheel, which includes a disk having a diameter substantially smaller than the rotation wheel.

BRIEF DESCRIPTION OF THE DRAWINGS

FIGS. 1-8b depict an embodiment of the present invention of a pivotally-leveraged manual centrifugal drive for use with a bowl and basket nested within the bowl, wherein:

FIG. 1 is a top perspective view showing the handle locked down;

FIG. 2 is a top perspective view showing the handle partly extended upwardly;

FIG. 3 is a top perspective exploded view;

FIG. 4 is a bottom perspective partial cutaway view, particularly showing the braking mechanism;

FIG. 6 is a sectional side view, showing a bowl and a basket mated with the pivotally-leveraged manual centrifugal drive.

FIG. 7 is a top perspective exploded view (from a different angle than FIG. 3) of the "drive-train."

FIGS. 8A and 8B are top perspective close-up views of the gears, respectively showing the clutch cog in an engaged position and an unengaged position.

DETAILED DESCRIPTION OF A PREFERRED EMBODIMENT

Figure 6:
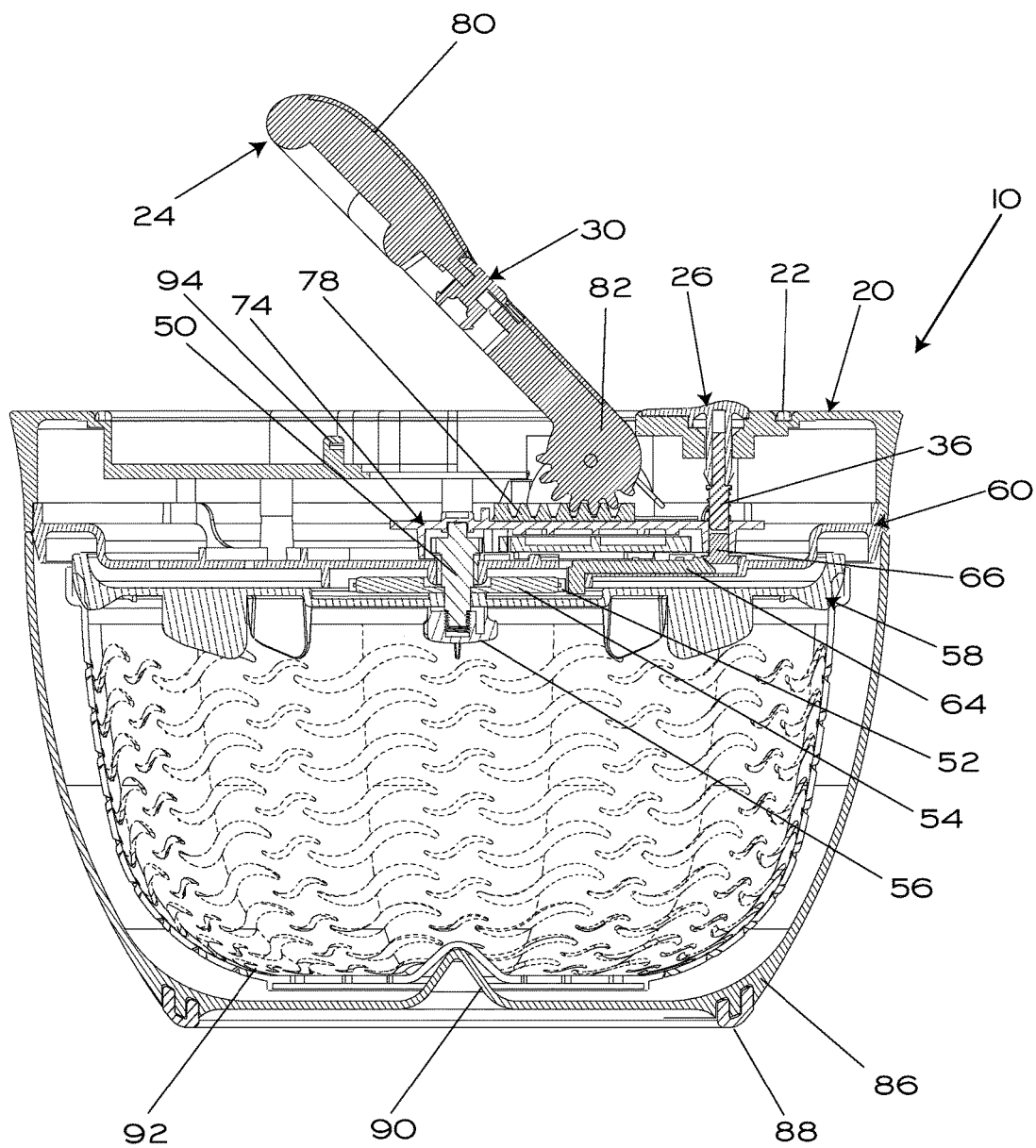

FIGS. 1-8b depict an embodiment of the present invention of a pivotally-leveraged manual centrifugal drive 20 for use with a bowl 86 and basket 92 nested within the bowl so as to form a manually-driven centrifugal drying device 10. As shown in FIG. 6, the pivotally-leveraged manual centrifugal drive 20 mates with a bowl 86 having solid walls and a conical protuberance 90 at its bottom, upon which the basket 92 (which is perforated and nests within the bowl 86) can spin during use. The bowl 86 may also include an annular high-friction footing 88 at its base. As manually-driven centrifugal drying devices generally including a spinning basket nested within a bowl are well-known, the present drawings and description are directed to the inventive pivotally-leveraged manual centrifugal drive 20 that spins the basket 92.

Figure 1:
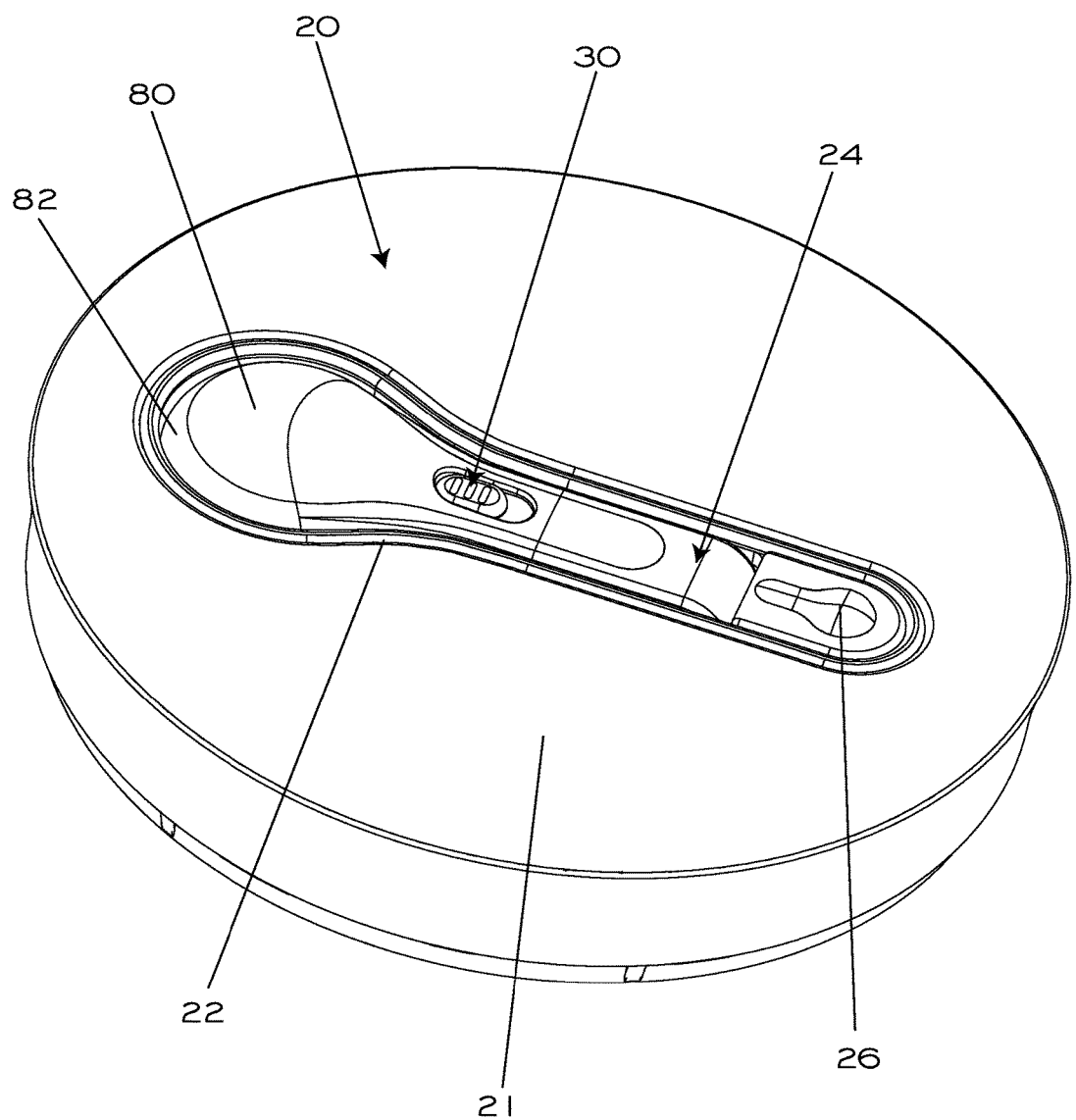
Figure 2:
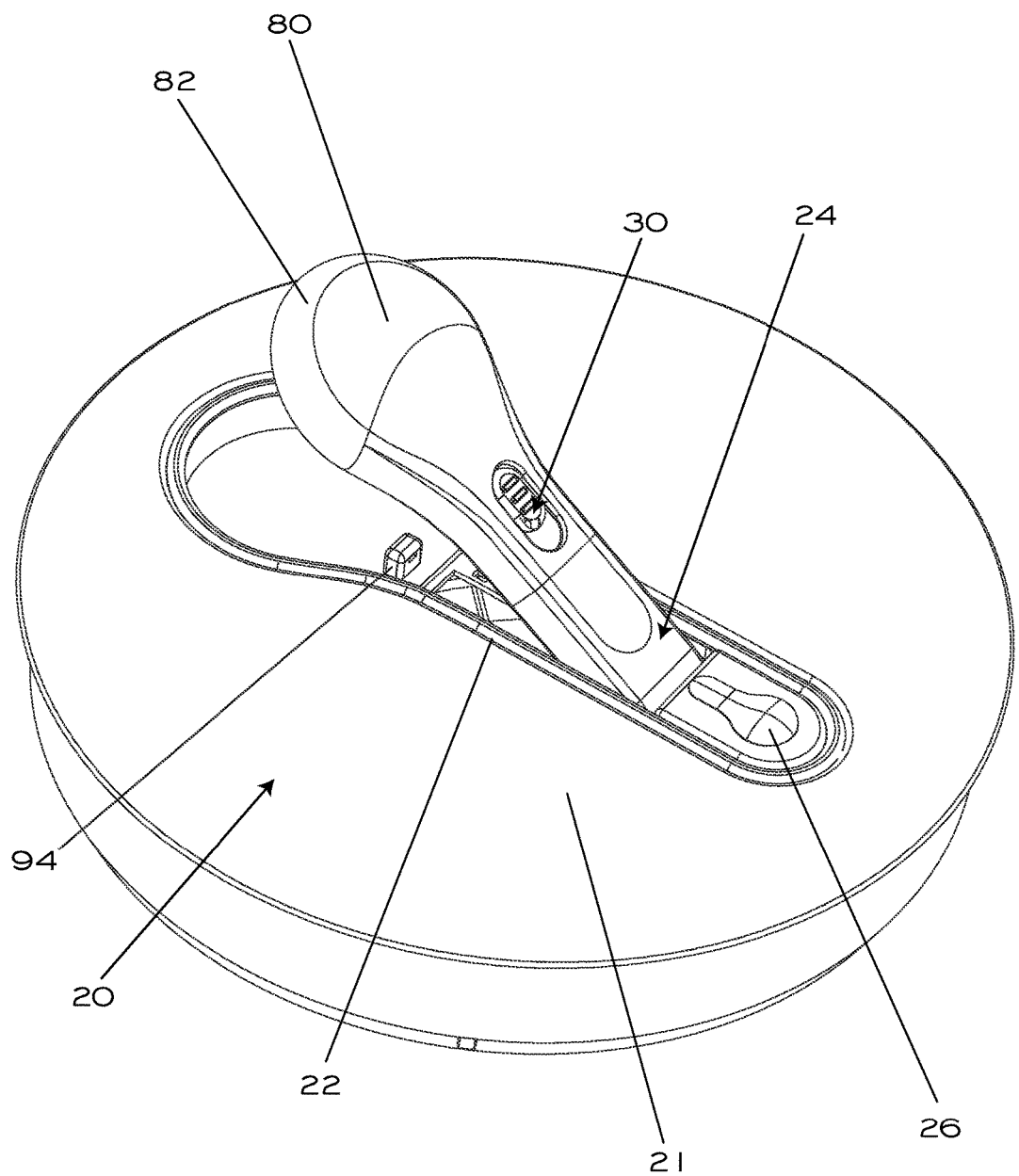
Figure 3:
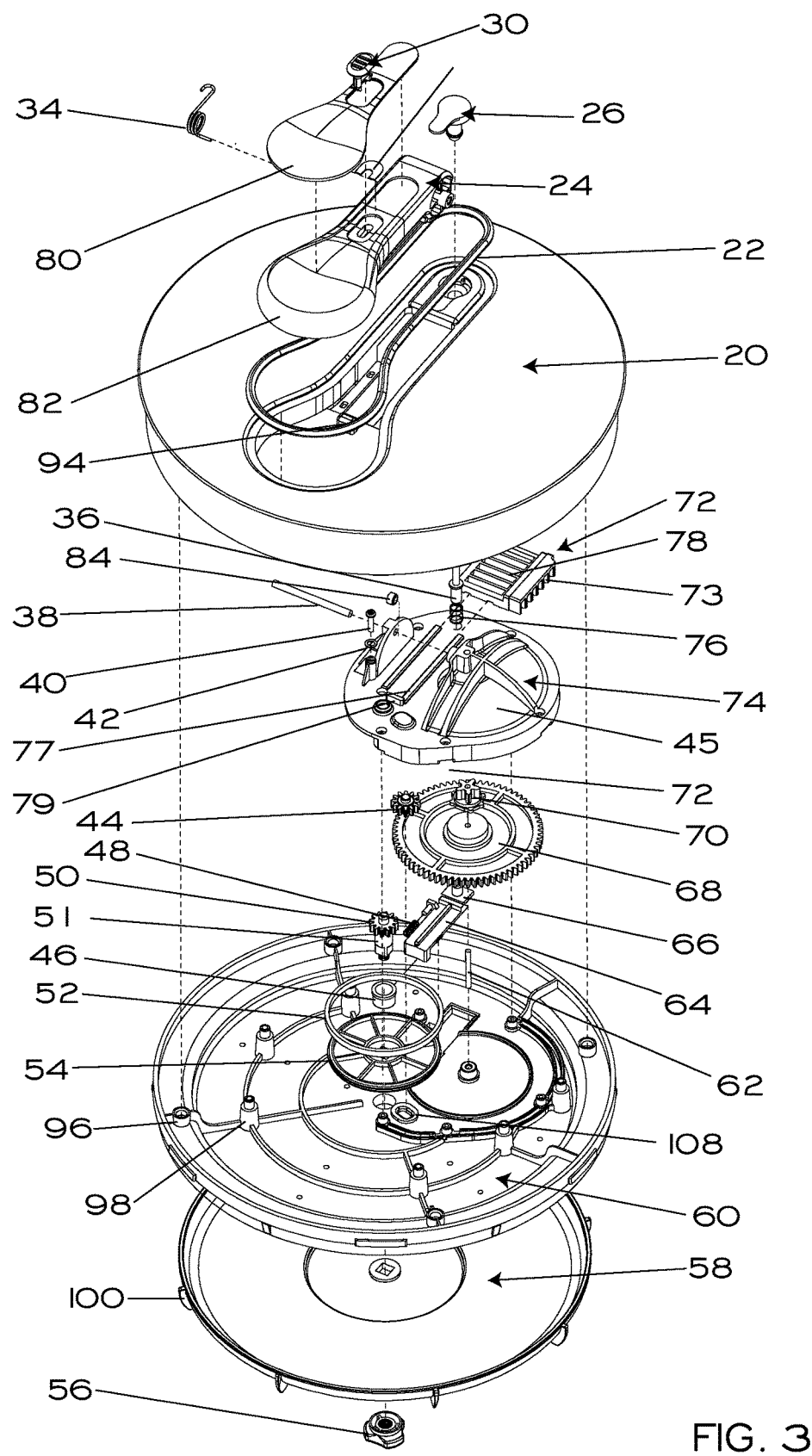
Figure 4:
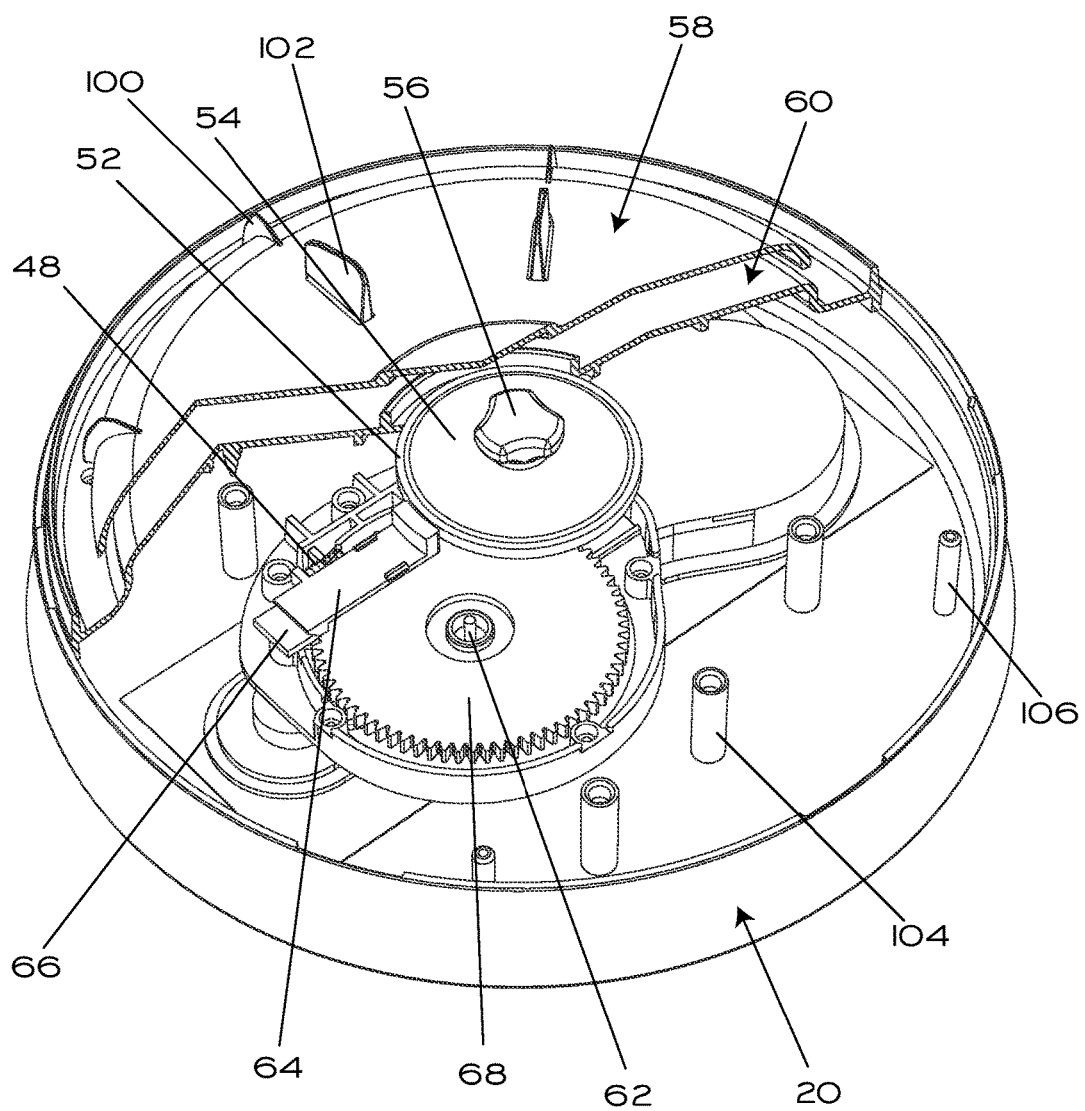
Figure 5A:
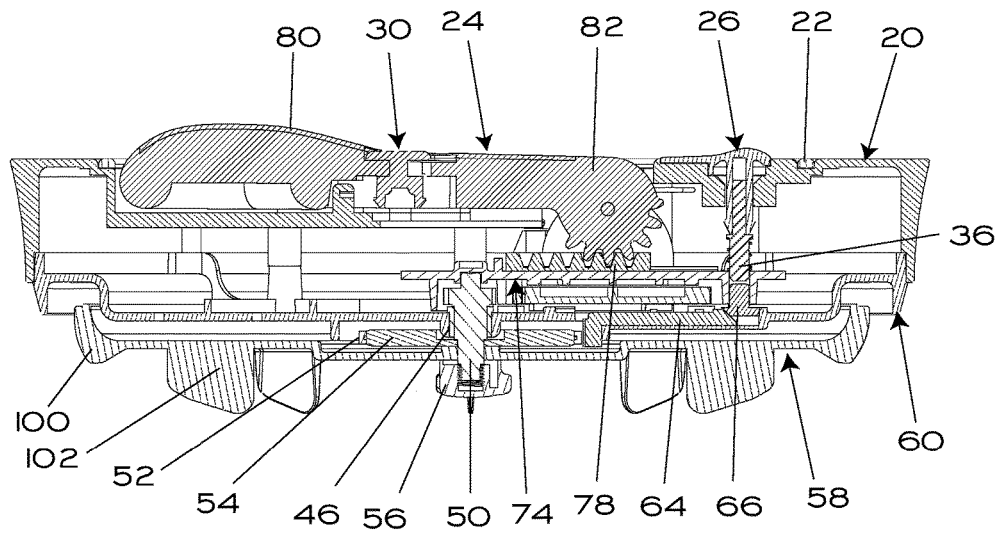
FIGS. 5A and 5B are sectional side views, respectively showing the handle in the locked-down position and in a partly-extended position.
Figure 5B:
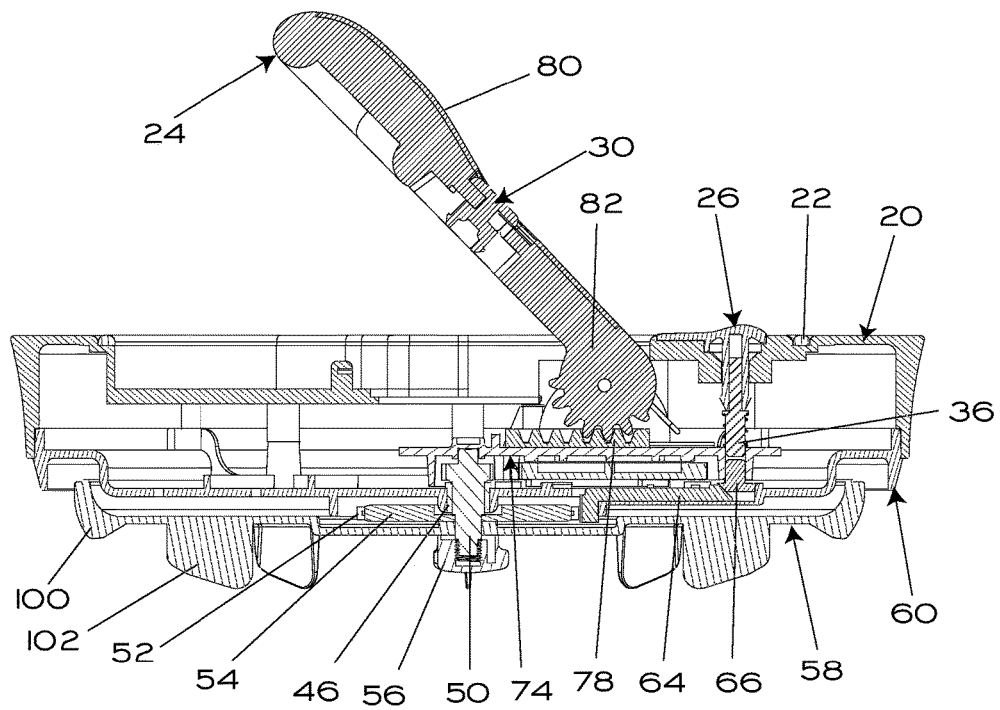
Figure 7:
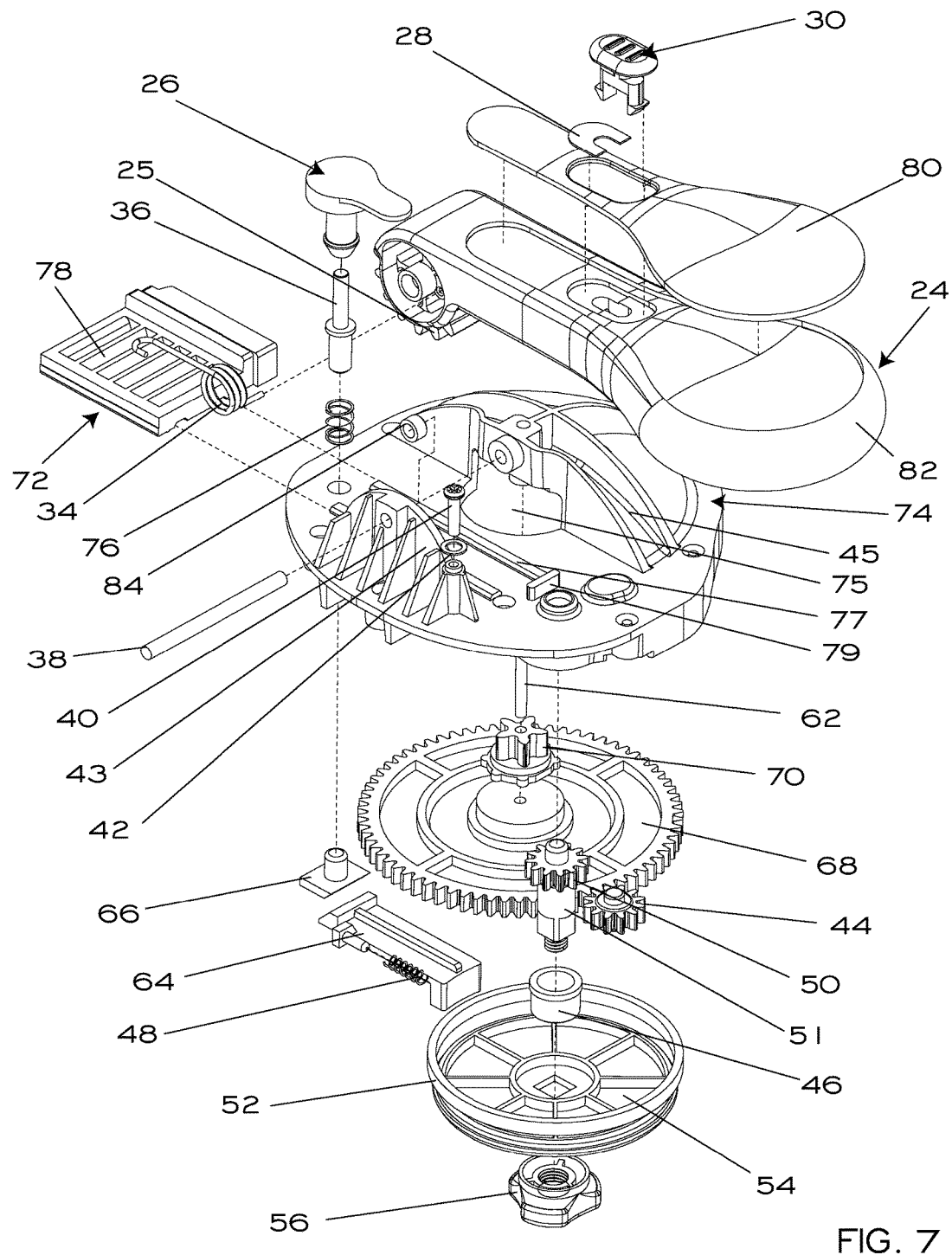

FIGS. 1 and 2 show a top perspective view of the pivotally-leveraged manual centrifugal drive 20, which primarily consists of a generally flat housing 21 and a handle 24 pivotally attached to the pivotally-leveraged manual centrifugal drive 20. A locking button 30 slides forward and backward on the handle 24 and includes a protruding pin (not shown) that inserts (when the handle 24 is in the down position as shown in FIG. 1 and the button 30 is moved forward) in a corresponding notch in the abutment 94, so as to lock the handle in the down position shown in FIG. 1. In the preferred embodiment, the handle can pivot further upwardly than shown in FIG. 2, such as to approximately a 90 degree angle with the housing 21. The pivotally-leveraged manual centrifugal drive 20 also includes a brake button 26, further described below. As best seen in FIGS. 3 and 7, the handle 24 is biased toward the fully upwardly pivoted position by a spring 34. (The straight end of the spring 34 is engaged within a corresponding hole in the cylindrical opening in the end of the handle 24 while the longer, curved end is retained on a screw 40 along with a ring 42). The handle 24 pivots on a shaft 38 (which is affixed at each end within corresponding holes formed in stanchion 43 and dome 45, with a bushing 84 placed on the shaft 38 to bear the central portion of spring 34), and a spring 34 urges the handle 24 upwardly so that as soon as a user stops pushing the handle 24 downwardly towards the pivotally-leveraged manual centrifugal drive 20, the handle 24 pivots upwardly back to an extended position. Rotation wheel 58 is driven uni-directionally by manual operation of the handle 24, and its fins 100 engage the basket 92 so that it rotates within the bowl 86. (Fins 102 are adapted to engage an optional, smaller-diameter "berry basket"—not shown—that can be nested within the basket 92).

Figure 8A:
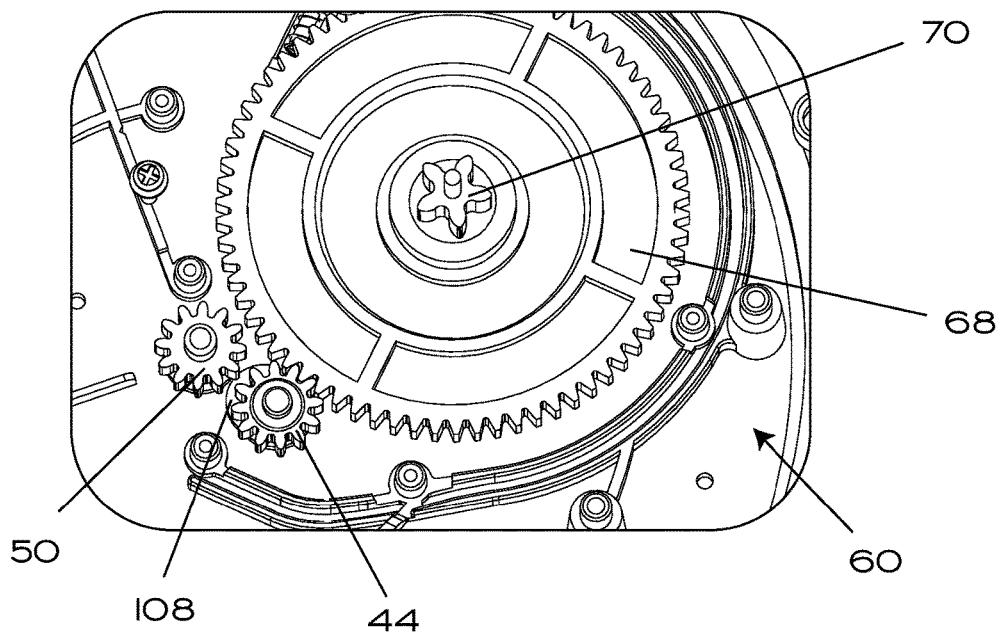
Figure 8B:
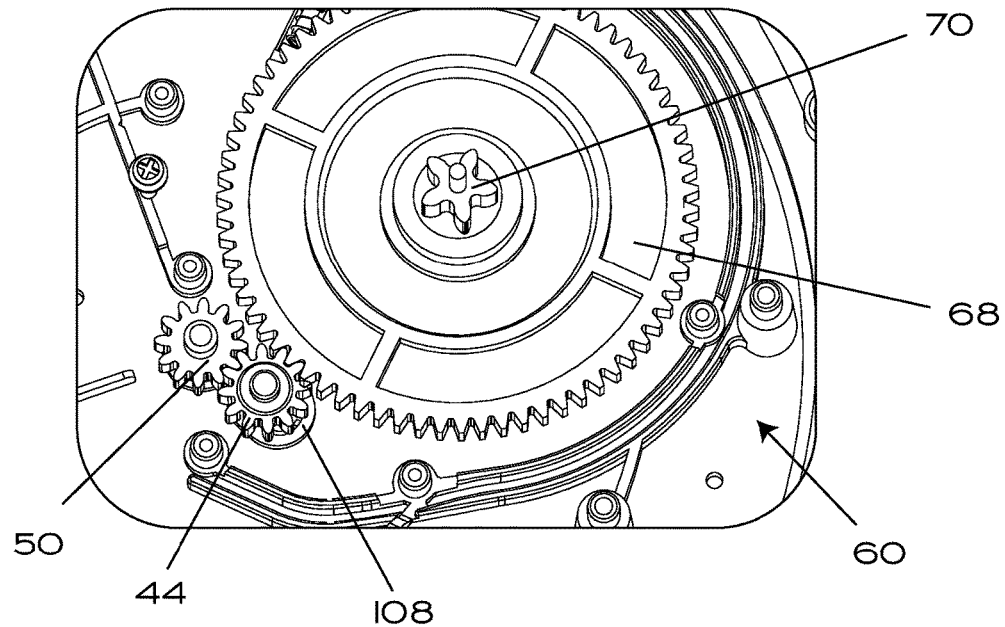

With particular reference to FIGS. 3-5B and 7, the transfer of force from manual operation of the handle 24 into the rotation wheel 58 is described. The teeth 25 at the pinion end 82 of the handle 24 (see FIGS. 5A and 5B), which are engaged with the teeth 78 of a rack 72, drive the rack 72 (which is free to slide on tracks 77 until hitting an abutment 79) in the direction away from axle 51 when the handle 24 is pushed downwardly toward the position shown in FIG. 5A. As seen in FIGS. 3 and 7, teeth 73 of the rack 72 engage (through aperture 75 in dome 45) pinion 70, which is fixedly attached to a drive wheel 68 and is stabilized on an axle 62 (which is received in a corresponding hole in the top interior of gear housing 74 such that the axle 62 can rotate within the hole). (Housing closure 60 is fixedly attached to housing 21 such as by locating pegs 106 in guide holes 96 and screws (not shown) in guides 98 and internally-threaded stanchions 104, and gear housing 74 is in turn fixedly attached to housing closure 60 such as by screws and stanchions). Thus downward and upward pivoting of the handle 24 produce forward and backward motion of the rack 72, producing resulting clockwise and counterclockwise rotation of the drive wheel 68. Clutch cog 44 clutches gear 50 only when drive wheel 68 is rotated clockwise as viewed in FIGS. 7-8B, however, because the ends of its axle are free to move within a slightly arcuate path 108 defined in housing closure 60 (and a corresponding slightly arcuate path defined in the opposing portion of the gear housing 74, the reverse outline of which is visible on the other side of gear housing 74 in FIGS. 3 and 7). Counterclockwise rotation of drive wheel 68 urges clutch cog 44 along slightly arcuate path 108 in the direction away from gear 50 and axle 51, and clockwise rotation urges it toward gear 50. As shown in FIG. 8B, when clutch cog 44 is clutching gear 50 (i.e., during clockwise rotation of the drive wheel 68 as viewed in FIGS. 7-8B), the "drive-train" shown in FIG. 7 is fully connected and produces leveraged revolution of gear 50 and rotation wheel 58 to which axle 51 is fixedly attached by endcap 56 (with a bushing 46 provided between the axle 51 and housing closure 60). As shown in FIG. 8A, when clutch cog 44 is not clutching gear 50 (i.e., during and after counterclockwise rotation of the drive wheel 68 as viewed in FIGS. 7-8B), the "drive-train" shown in FIG. 7 is not connected such that rotation wheel 58 (to which axle 51 is fixedly attached) is therefore free to spin irrespective of the motion of the rest of the drive-train and gears. Preferably for added stability (not shown), instead of a single drive gear 68, a symmetric, counter-rotating double-drive gear may be used, each having a pinion driven by teeth on opposing sides of a wider rack. One of ordinary skill also of course will recognize that a variety of other suitable mechanisms known in the art readily could be adapted as an alternative means of transferring the pivotal motion of the handle 24 into rotation of rotation wheel 58.

In a further optional feature, a brake means including a brake disk 54 can be employed to indirectly decelerate the rotation wheel 58. In the embodiment shown in the Figures, the brake disk 54 includes a high-friction tire 52 and is indirectly fixedly attached to the rotation wheel 58 (e.g., by endcap 56 screwed onto axle 51 or other suitable means such as a snap-lock). The tire 52 is slowed when the ram 64 impinges upon it. The ram 64 is biased against contact with the tire 52 by a spring 48, and is activated by manual pressure on the brake button 26. Manual pressure on the brake button 26 plunges a rod 36 downwardly against the bias of the spring 76, moving a wedge 66 downwardly. Downward movement of the wedge 66 forces the complementary wedge-shaped face on the rod 64 to drive the other end of the rod 64 into contact with the tire 52, slowing the disk 54, and thus the axle 51, and thus the rotation wheel 58.

It is noted that the majority of the parts of the described embodiment of a pivotally-leveraged manual centrifugal drive preferably can be made of plastics that are suitably hard, strong, and durable, with only limited parts (such as the axle 62, gear 50, teeth 73, screws, springs, etc.) being optionally or preferably made of metals such as steel and/or zinc.

Although the present invention has been described in detail in the context of a preferred embodiment of a pivotally-leveraged manual centrifugal drive for use with a nested basket and bowl so as to form a manually-driven centrifugal drying device, one skilled in the art will appreciate that numerous variations, modifications, and other applications are also within the scope of the present invention. Thus, the foregoing detailed description is not intended to limit the invention in any way, which is limited only by the following claims and their legal equivalents.

What is claimed is:

1. A device for use with food items, comprising:
    an apparatus defining a holding area for food items;
    a manually-operable handle pivotally coupled to the apparatus, the manually-operable handle pivotable relative to the apparatus about a handle axis of rotation between an extended position and a down position;
    a basket disposed within the apparatus, the basket rotatable relative to the apparatus about a basket axis of rotation to spin food items, the basket axis of rotation being non-parallel with the handle axis of rotation, wherein the basket is a perforated basket having a bottom and a generally cylindrical sidewall extending from the bottom; and
    a drive-train including a clutch and connecting the manually-operable handle to the basket such that the basket is rotated about the basket axis of rotation in response to the manually-operable handle pivoting between the extended position and the down position;
    wherein the manually-operable handle extends from the handle axis of rotation such that a line running through and collinear with the basket axis of rotation would pass through the manually-operable handle when the manually-operable handle is in the down position.

2. The device of claim 1, wherein the manually-operable handle extends from the handle axis of rotation and across an imaginary projection of the basket taken along the basket axis of rotation.

3. The device of claim 1, wherein the handle axis of rotation is spaced apart from the basket in a direction parallel to the basket axis of rotation.

4. The device of claim 1, further comprising a rotatable axle that rotates about an axle axis of rotation as the manually-operable handle travels between the extended position and the down position, the axle axis of rotation being collinear with the basket axis of rotation.

5. The device of claim 1, wherein the drive-train comprises a drive shaft coupled to the basket, the drive shaft having a first end, a second end, and a main body extending between the first end and the second end, the first end being coupled to the basket, the second end comprising a first gear rotatable about the basket axis of rotation, the first gear mates with a second gear drivably connecting the manually-operable handle to the first gear.

6. The device of claim 1, the apparatus further comprising a bowl within which the basket is disposed.

7. The device of claim 6, further comprising a lid assembly configured to removably mate with the bowl and to engage the basket.

8. The device of claim 7, wherein the handle extends substantially parallel to and diametrically across the lid assembly when the handle is in the down position.

9. The device of claim 1, wherein the apparatus includes a footing.

10. The device of claim 1, wherein the handle is biased toward the extended position.

11. The device of claim 10, wherein the drive-train is configured such that downward and upward pivoting of the handle uni-directionally rotates the basket.

12. The device of claim 1, wherein the clutch comprises a cog with an axle having ends set within a path.

13. The device of claim 1, wherein the drive-train is configured so that the clutch is not engaged when the handle moves upwardly.

* * * * *